J. P. MANNY.
Harvester.

No. 166,018.

3 Sheets--Sheet 2.

Patented July 27, 1875.

WITNESSES
H. H. Young
Jos. S. Peyton.

INVENTOR
John P. Manny
By W. D. Baldwin, his Attorney

J. P. MANNY.
Harvester.

No. 166,018.

3 Sheets--Sheet 3.

Patented July 27, 1875.

UNITED STATES PATENT OFFICE.

JOHN P. MANNY, OF ROCKFORD, ILLINOIS.

IMPROVEMENT IN HARVESTERS.

Specification forming part of Letters Patent No. 166,018, dated July 27, 1875; application filed November 28, 1874.

*To all whom it may concern:*

Be it known that I, JOHN P. MANNY, of Rockford, in the county of Winnebago and State of Illinois, have invented certain new and useful Improvements in Harvesters, of which the following is a specification:

The nature of my improvements and the subject-matter herein claimed are hereinafter specifically designated.

Figure 1:
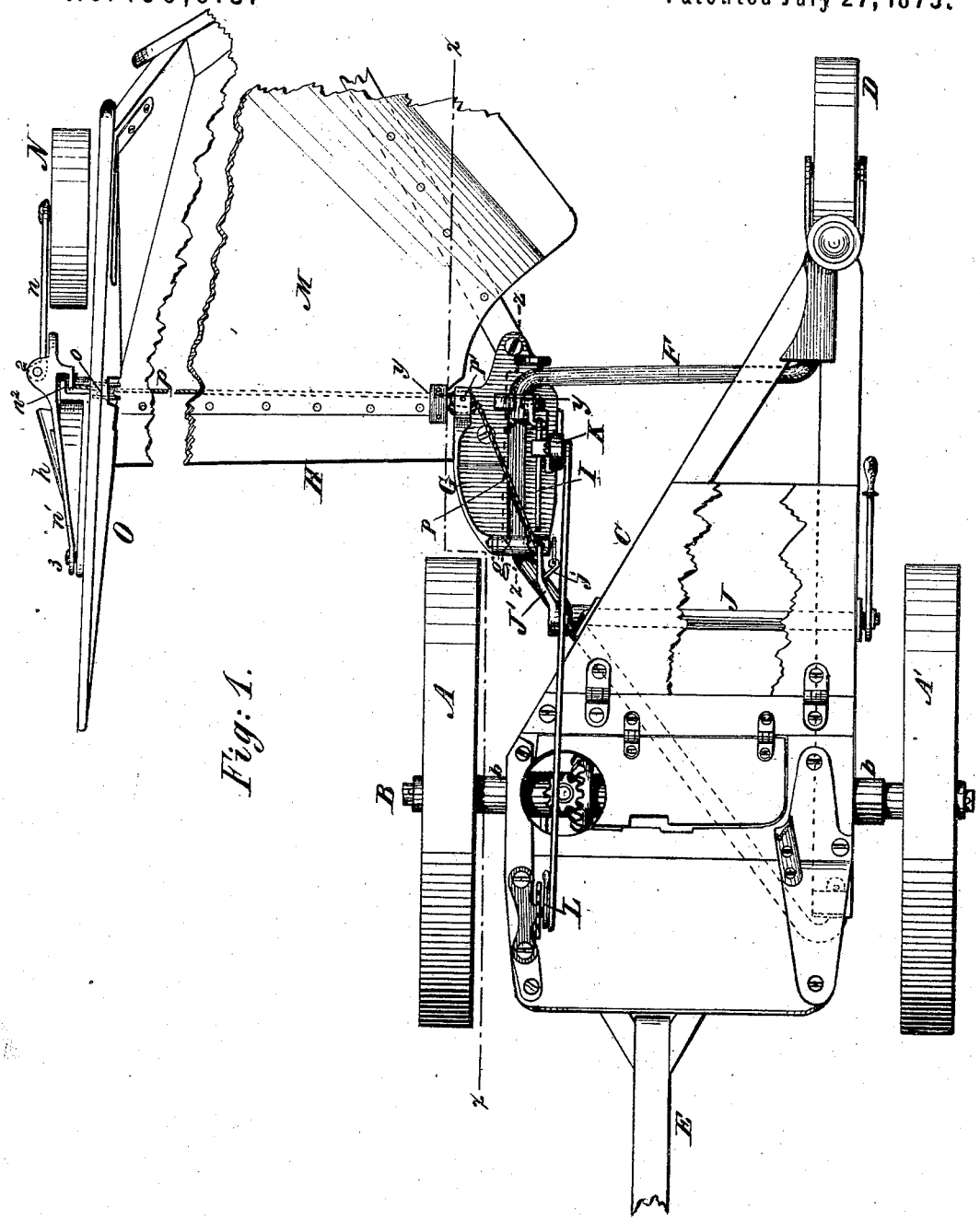
Figure 2:
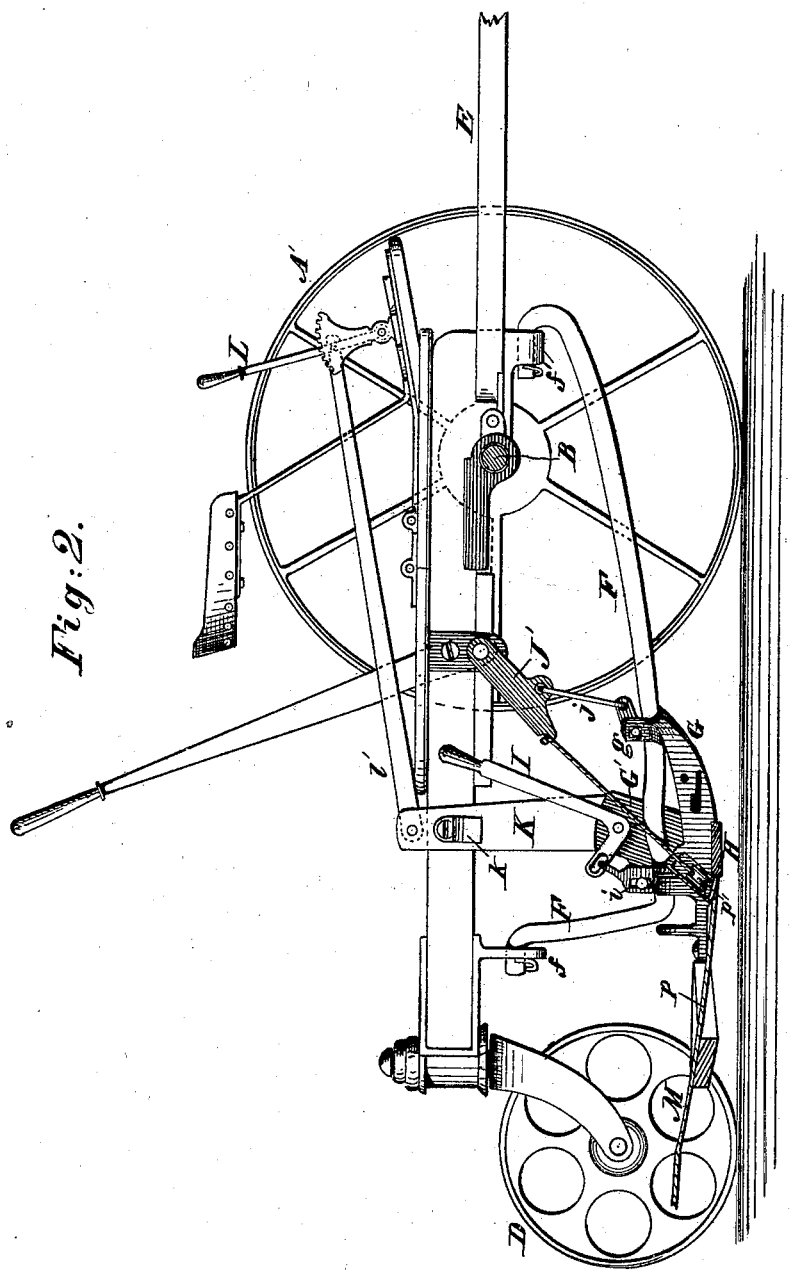
Figure 3:
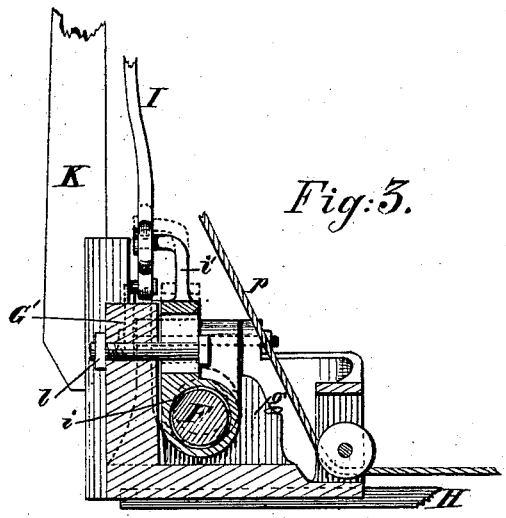
Figure 4:
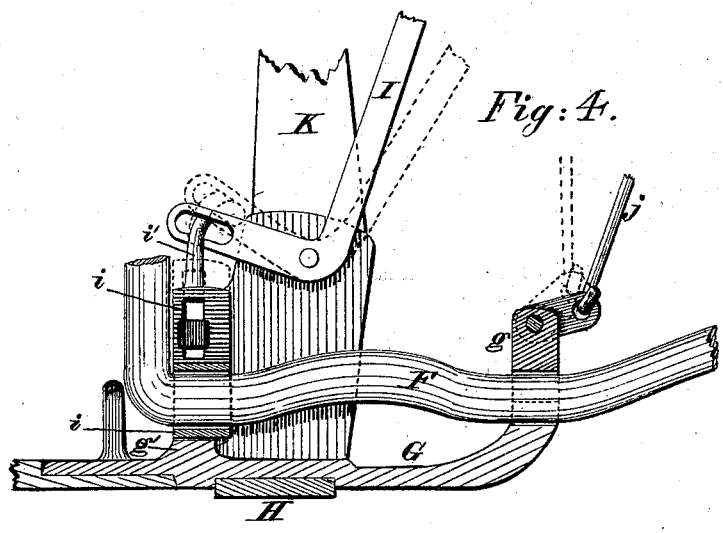

In the accompanying drawings, Figure 1 represents a plan or top view of so much of a harvester embodying all the improvements herein claimed in the best way now known to me as is necessary to illustrate the subject-matter herein claimed. Fig. 2 represents a vertical section therethrough on the line $x\ x$ of Fig. 1. Fig. 3 represents a vertical transverse section through the inner shoe on the line $y\ y$ of Fig. 1, and Fig. 4 a similar longitudinal section on the line $z\ z$ of Fig. 1.

The machine herein shown and described resembles, in many of its features, the one shown in Letters Patent No. 125,746, granted to me April 16, 1872, of which it constitutes an improvement.

Two main driving and supporting wheels, A A', turn freely on a main axle, B, with which they are connected by suitable backing-ratchets. The main axle turns in boxes $b$ in a main frame, C, the rear end of which is supported by a caster-wheel, D. A tongue, E, is hinged to lugs on the boxes. A coupling-frame, F, consisting of a single continuous bar bent into proper shape is pivoted underneath the main frame in front and rear at or near the line of the outer frame timber to lugs $f f'$, so as to allow it to play up and down freely. This coupling bar or frame passes through lugs or eyes $g\ g'$ in the front and rear, respectively, of a shoe, G, in a recess in the under side of which a finger-beam, H, is secured. It is desirable that the shoe should have the faculty of rocking, so as to vary the inclination of the points of the guards. To this end I make the front eye $g$ of the shoe somewhat larger than the coupling-bar which passes through it, so as to allow it a slight degree of lateral play therein. The rear lugs $g'$ of the shoe are slotted to receive an eye or loop, $i$, which encircles the coupling-bar, and is with it capable of moving up and down in the slot above mentioned. A slotted bracket, $i$, in which the loop is formed, is provided with a set-screw, $l$, taking into a bracket, G', on the shoe, by which means the shoe and coupling-bar may be locked together in the relation desired. To place this adjustment within the control of the driver a lever, I, is pivoted on the bracket G', and connected with the loop-bracket $i$ by a link, $i'$, or slot and pin, of well-known construction.

In order to enable the driver readily to raise or lower the heel end of the finger-beam and coupling-frame, I mount a rock-shaft, J, upon the main frame, providing it at one end with a hand-lever and detent, and at the other with a crank-arm, J'. A link, $j$, connects this crank-arm with an arm on the front lug $g$ of the shoe.

In order to hold the cutting apparatus in an upright position, or that which it occupies when folded up against the main frame for transportation, I mount a post, K, on the shoe, and provide it with a swinging latch, $k$, which fits over the rear part of the coupling-bar when the finger-beam is turned up into the proper position, and holds it there, the link $l'$ being first disconnected from the post. To enable the driver to rock the guards at pleasure, I connect this post by a link, $l'$, with a rocking-lever, L, pivoted on the main frame, and provided with the usual detent.

To adapt the machine for use as a hand-raker, a platform, M, is attached to the finger-beam or shoe in any of the usual well-known ways.

In mowing a simple divider, $h$, is mounted on the grain end of the finger-beam which slides upon the ground, or, if preferred, a divider-wheel may be used. In reaping a grain-wheel is necessary. In order to facilitate the removal and attachment of this grain-wheel I mount said wheel N in an arm, $n$, capable of swinging horizontally on its pivot 2 in an arm, $n^1$, pivoted, at 3, to a supplementary divider, O, attached to the platform, and fitting on the mower-divider $h$ in such manner as to admit of its being readily slipped on or off. The arm $n^1$ plays up and down on its pivot, being guided by a flange, $n^2$, on the divider O. A cord, $p$, attached to the arm $n^1$ passes under a pulley, $o$, in the divider-board O, and under the platform to the gearing end of the finger-beam, where it passes under a pulley, $p'$, in the shoe to the crank-arm $J'$ of the rock-shaft. The cord is attached to the outer end of the crank-arm, and the link $j$ connecting the shoe with said arm is attached near the middle thereof, this relation being designed to produce the coincidence of movement necessary to secure the preservation of the horizontality of the cutting apparatus while lifting both ends simultaneously.

In operation my improvements will, of course, be used on a fully-organized harvester. A self-rake may readily be applied to my machine.

Having thus fully described my improved machine, what I claim therein as new, and desire to secure by Letters Patent, is—

1. The combination of the coupling-frame, the shoe, the bracket thereon, the adjustable loop, and the lever I, these members being constructed and operating in combination, substantially as set forth.

2. The combination of the main frame, the coupling-frame, the shoe, the adjustable loop, the post, the hand-lever, and the link connecting the post and lever, these members being constructed and operating in combination, substantially as set forth.

3. The combination of the coupling-frame, shoe, finger-beam, post, and swinging latch, these members being constructed and operating in combination, substantially as set forth.

4. The combination of the main frame, the coupling-frame, the shoe, the finger-beam, the rock-shaft, its crank-arm, the link connecting the crank-arm and shoe, the grain-wheel, its hinged arm, and the lifting-cord extending from the grain-wheel arm through the shoe to the crank-arm, these members being constructed and operating in combination, substantially as hereinbefore set forth.

In testimony whereof I have hereunto subscribed my name.

JOHN P. MANNY.

Witnesses:
  WM. J. PEYTON,
  E. C. DAVIDSON.